United States Patent
Gupta et al.

(10) Patent No.: US 11,634,136 B2
(45) Date of Patent: *Apr. 25, 2023

(54) VEHICULAR TRAILER HITCHING ASSIST SYSTEM

(71) Applicant: MAGNA ELECTRONICS INC., Auburn Hills, MI (US)

(72) Inventors: Nikhil Gupta, Brampton (CA); Horst D. Diessner, Rochester Hills, MI (US); Richard Bozich, Canton, MI (US); Jyothi P. Gali, Rochester Hills, MI (US); Aleksandar Stefanovic, Mississauga (CA); Hilda Faraji, Toronto (CA); Miad Moarref, Concord (CA); Xai Phan, Mississauga (CA); Galina Okouneva, Markham (CA); Brijendra Kumar Bharti, Brampton (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/303,188

(22) Filed: May 24, 2021

(65) Prior Publication Data

US 2021/0276557 A1    Sep. 9, 2021

Related U.S. Application Data

(63) Continuation of application No. 15/885,855, filed on Feb. 1, 2018, now Pat. No. 11,014,561.

(Continued)

(51) Int. Cl.
    *B60W 30/18*   (2012.01)
    *B60W 10/18*   (2012.01)
    (Continued)

(52) U.S. Cl.
    CPC ......... *B60W 30/18036* (2013.01); *B60R 1/00* (2013.01); *B60W 10/10* (2013.01);
    (Continued)

(58) Field of Classification Search
    CPC ............................................. B60W 30/18036
    See application file for complete search history.

(56) References Cited

U.S. PATENT DOCUMENTS

| 5,550,677 A | 8/1996 | Schofield et al. |
| 5,670,935 A | 9/1997 | Schofield et al. |

(Continued)

*Primary Examiner* — Michael A Berns
(74) *Attorney, Agent, or Firm* — Honigman LLP

(57) ABSTRACT

A vehicular trailer hitching assist system includes a camera disposed at a rear portion of a vehicle and viewing at least rearward of the vehicle. An electronic control unit (ECU) includes an image processor operable to process image data captured by the camera. The ECU, via image processing of image data captured by the camera, detects a trailer rearward of the vehicle and determines a first path of travel for the vehicle to follow to maneuver the vehicle toward the trailer and to align the tow ball of the vehicle with a trailer hitch of the trailer. The ECU generates an output to maneuver the vehicle along the determined first path of travel. Responsive to detection of an object entering the first path of travel, the ECU determines a second path of travel for the vehicle to follow that avoids the detected object entering the determined path of travel.

29 Claims, 13 Drawing Sheets

Related U.S. Application Data

(60) Provisional application No. 62/453,126, filed on Feb. 1, 2017.

(51) Int. Cl.

| | | |
|---|---|---|
| *B60W 10/20* | (2006.01) | |
| *B60W 30/09* | (2012.01) | |
| *G05D 1/02* | (2020.01) | |
| *B60R 1/00* | (2022.01) | |
| *G08G 1/16* | (2006.01) | |
| *B60W 10/10* | (2012.01) | |

(52) U.S. Cl.
CPC ............ B60W 10/18 (2013.01); B60W 10/20 (2013.01); B60W 30/09 (2013.01); G05D 1/0212 (2013.01); G05D 1/0214 (2013.01); G05D 1/0246 (2013.01); G08G 1/165 (2013.01); G08G 1/166 (2013.01); *B60R 2300/30* (2013.01); *B60R 2300/305* (2013.01); *B60R 2300/607* (2013.01); *B60R 2300/808* (2013.01); *B60R 2300/8066* (2013.01); *B60R 2300/8093* (2013.01); *B60W 2420/42* (2013.01); *B60W 2554/00* (2020.02); *B60W 2710/10* (2013.01); *B60W 2710/18* (2013.01); *B60W 2710/20* (2013.01); *B60W 2720/106* (2013.01); *B60W 2720/24* (2013.01); *G05D 2201/0213* (2013.01)

(56) References Cited

U.S. PATENT DOCUMENTS

| | | | |
|---|---|---|---|
| 5,949,331 | A | 9/1999 | Schofield et al. |
| 6,690,268 | B2 | 2/2004 | Schofield et al. |
| 7,005,974 | B2 | 2/2006 | McMahon et al. |
| 8,874,317 | B2 | 10/2014 | Marczok et al. |
| 9,085,261 | B2 | 7/2015 | Lu et al. |
| 9,164,955 | B2 | 10/2015 | Lavoie et al. |
| 9,446,713 | B2 | 9/2016 | Lu et al. |
| 9,558,409 | B2 | 1/2017 | Pliefke et al. |
| 9,779,313 | B2 | 10/2017 | Pliefke et al. |
| 9,802,542 | B2 | 10/2017 | Lu et al. |
| 9,914,333 | B2 | 3/2018 | Shank et al. |
| 10,086,870 | B2 | 10/2018 | Gieseke et al. |
| 10,089,541 | B2 | 10/2018 | Pliefke et al. |
| 10,160,382 | B2 | 12/2018 | Pliefke et al. |
| 10,214,206 | B2 | 2/2019 | Latotzki |
| 10,300,855 | B2 | 5/2019 | Lu et al. |
| 10,328,932 | B2 | 6/2019 | Gieseke et al. |
| 10,384,609 | B2 | 8/2019 | Zhang et al. |
| 10,493,917 | B2 | 12/2019 | Pliefke et al. |
| 10,532,698 | B2 * | 1/2020 | Potnis ............ B60D 1/64 |
| 10,552,976 | B2 * | 2/2020 | Diessner ............ G06T 7/60 |
| 10,586,116 | B2 | 3/2020 | Nakaya |
| 10,586,119 | B2 | 3/2020 | Pliefke et al. |
| 10,706,291 | B2 * | 7/2020 | Diessner ............ G06T 7/73 |
| 10,885,652 | B2 * | 1/2021 | Gupta ............ B62D 15/027 |
| 11,014,561 | B2 | 5/2021 | Gupta et al. |
| 11,067,993 | B2 * | 7/2021 | Gali ............ B60W 10/20 |
| 11,377,029 | B2 * | 7/2022 | Yunus ............ G06T 7/70 |
| 11,433,944 | B2 * | 9/2022 | Niewiadomski ......... B60D 1/62 |
| 2014/0085472 | A1 | 3/2014 | Lu et al. |
| 2014/0160276 | A1 | 6/2014 | Pliefke et al. |
| 2015/0002670 | A1 | 1/2015 | Bajpai |
| 2015/0217693 | A1 | 8/2015 | Pliefke et al. |
| 2015/0344028 | A1 | 12/2015 | Gieseke et al. |
| 2017/0015312 | A1 | 1/2017 | Latotzki |
| 2017/0017848 | A1 | 1/2017 | Gupta et al. |
| 2017/0050672 | A1 | 2/2017 | Gieseke et al. |
| 2017/0217372 | A1 | 8/2017 | Lu et al. |
| 2017/0253237 | A1 | 9/2017 | Diessner |
| 2017/0254873 | A1 | 9/2017 | Koravadi |
| 2017/0317748 | A1 | 11/2017 | Krapf |
| 2017/0329346 | A1 | 11/2017 | Latotzki |
| 2018/0215382 | A1 | 8/2018 | Gupta et al. |
| 2018/0253608 | A1 | 9/2018 | Diessner et al. |
| 2018/0276838 | A1 | 9/2018 | Gupta et al. |
| 2018/0276839 | A1 | 9/2018 | Diessner et al. |
| 2019/0016264 | A1 | 1/2019 | Potnis et al. |
| 2019/0064831 | A1 | 2/2019 | Gali et al. |

\* cited by examiner

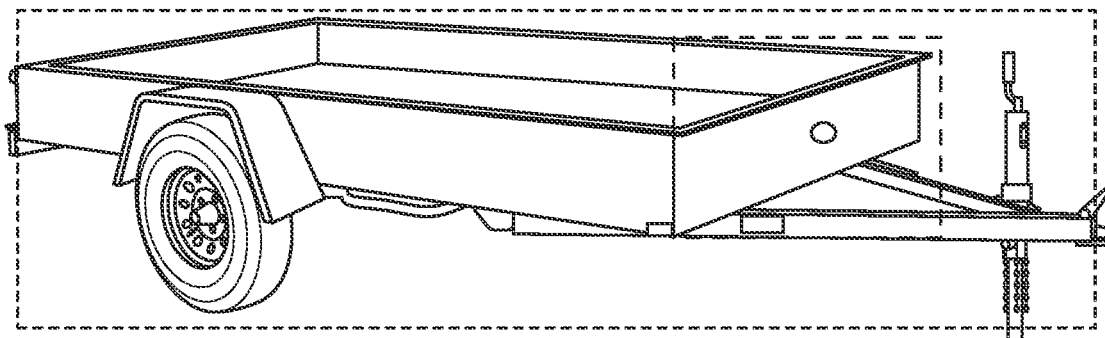
FIG. 8
 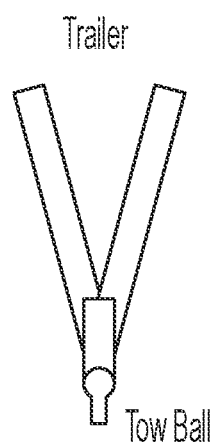 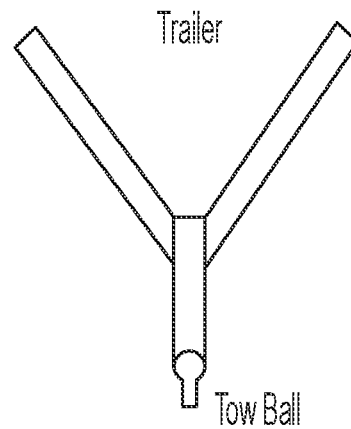
FIG. 9A  FIG. 9B  FIG. 9C

US 11,634,136 B2

VEHICULAR TRAILER HITCHING ASSIST SYSTEM

CROSS REFERENCE TO RELATED APPLICATIONS

The present application is a continuation of U.S. patent application Ser. No. 15/885,855, filed Feb. 1, 2018, now U.S. Pat. No. 11,014,561, which claims the filing benefits of U.S. provisional application Ser. No. 62/453,126, filed Feb. 1, 2017, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a trailer hitch assistance system for a vehicle that utilizes one or more cameras (preferably one or more CMOS cameras) to capture image data representative of images exterior of the vehicle, and controls the vehicle to reverse the vehicle toward a trailer and to a location where the vehicle can be hitched to the trailer. The system provides control algorithms to assist the driver with maneuvering the vehicle back to the trailer ready for hitching without the need for manual steering, braking, acceleration, and/or shifting of gears (or a subset thereof) that is input by the driver.

These and other objects, advantages, purposes and features of the present invention will become apparent upon review of the following specification in conjunction with the drawings.

BRIEF DESCRIPTION OF THE DRAWINGS

FIG. 8 is a perspective view of a trailer;

FIGS. 9A-D show various trailer tongue and hitch configurations;

DESCRIPTION OF THE PREFERRED EMBODIMENTS

A vehicle vision system and/or trailer hitch assist system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
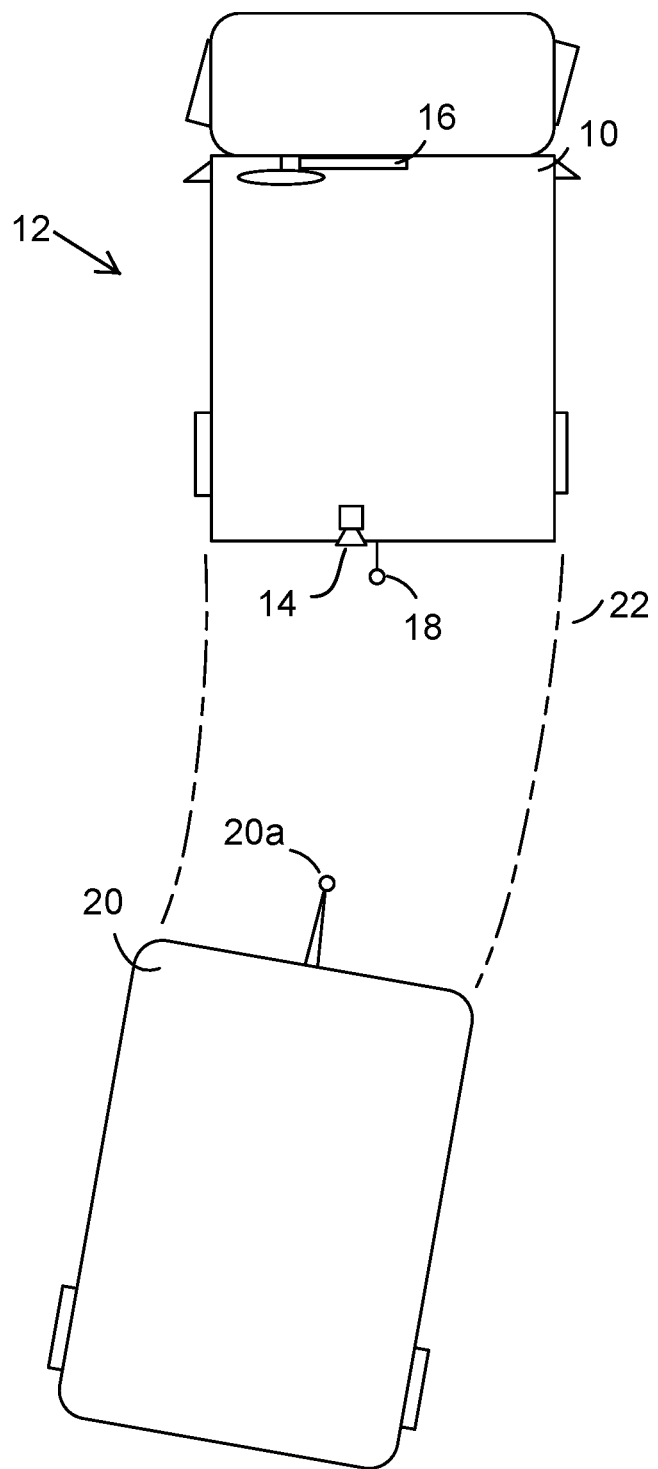
FIG. 1 is a plan view of a vehicle with a trailer hitching assist system that is operable to control or guide the vehicle to reverse the vehicle toward and into alignment with a trailer hitch of a trailer in accordance with the present invention.
Figure 3:
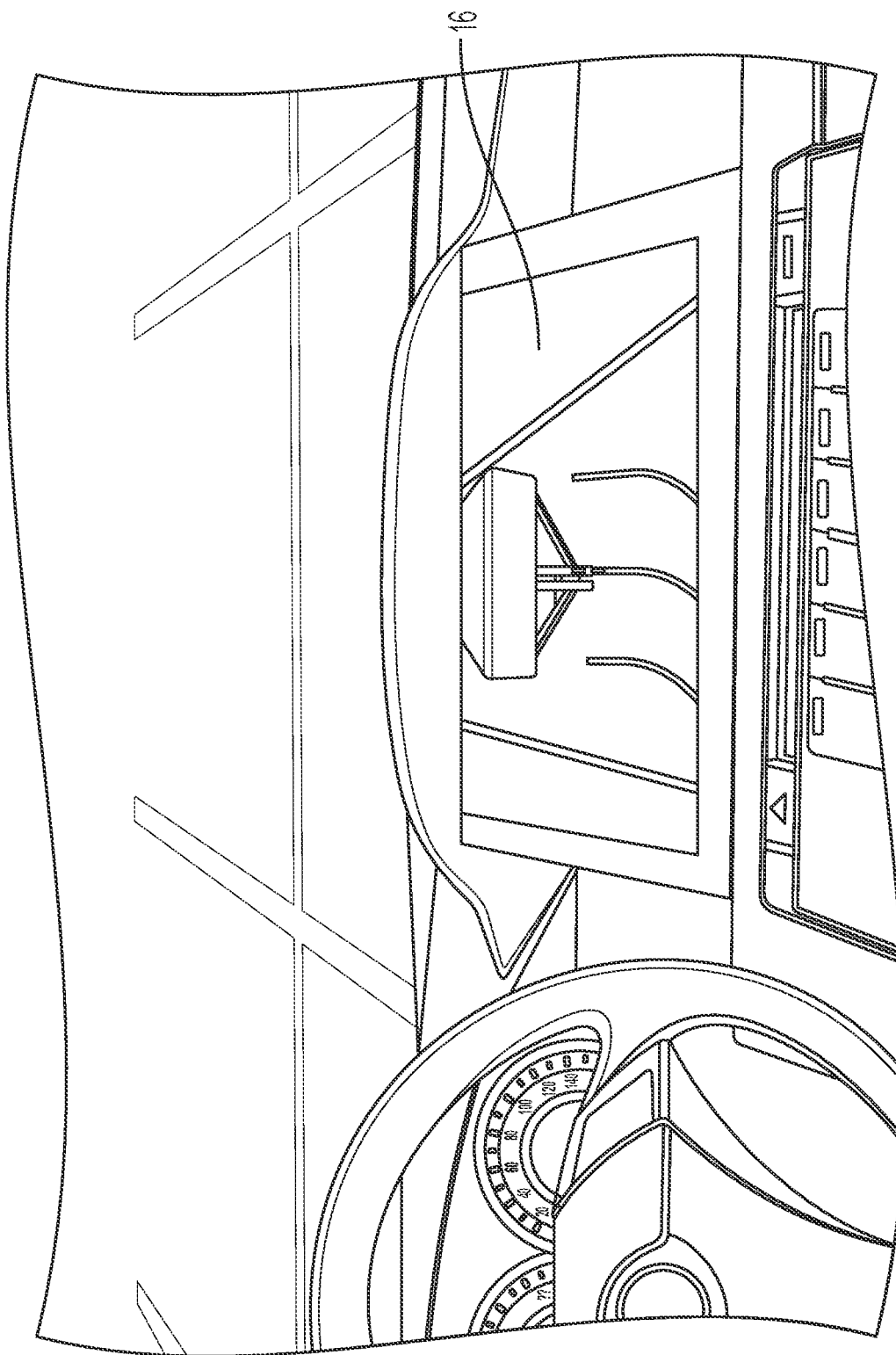
FIG. 3 is a view of a display screen in the vehicle that is displaying video images captured by a rearward viewing camera of the vehicle.

Referring now to the drawings and the illustrative embodiments depicted therein, a vehicle 10 includes a trailer hitching assist system or vision system 12 that includes at least one exterior viewing imaging sensor or camera, such as a rearward viewing imaging sensor or camera 14 (and the system may optionally include multiple exterior viewing imaging sensors or cameras, such as a forward viewing camera at the front (or at the windshield) of the vehicle, and a sideward/rearward viewing camera at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The trailer hitching assist system 12 includes a control or electronic control unit (ECU) or processor that is operable to process image data captured by the camera or cameras and may detect objects or the like and/or provide displayed images at a display device 16 (FIGS. 1 and 3) for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
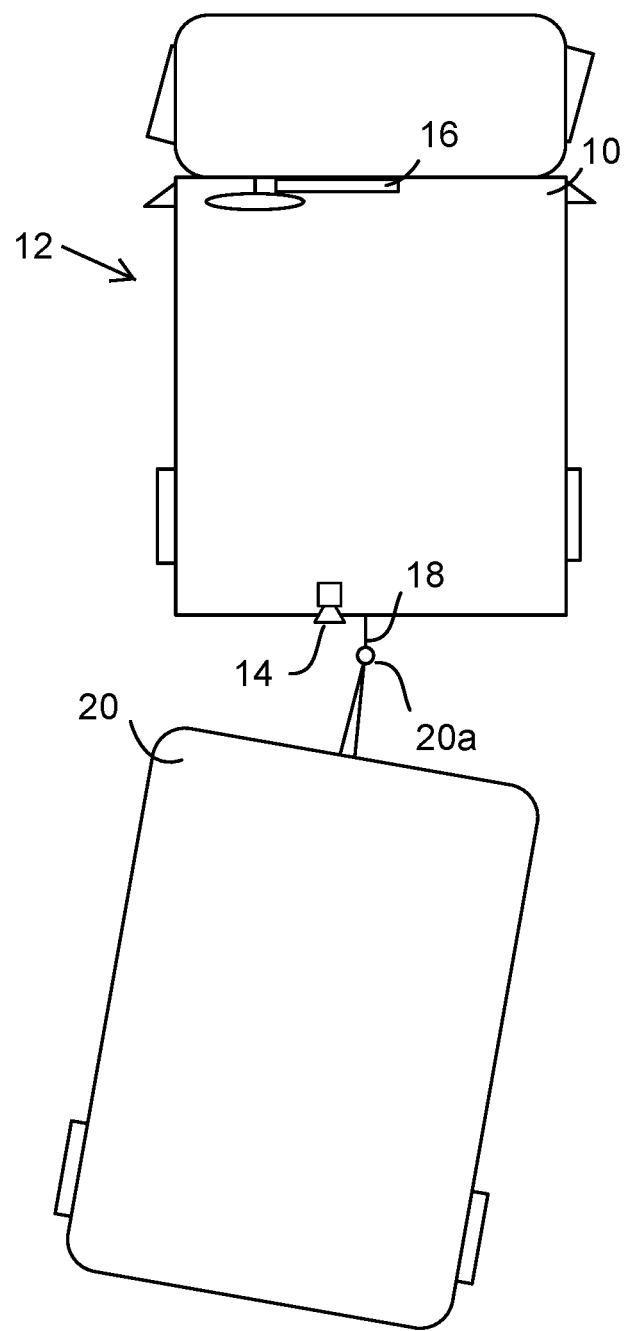
FIG. 2 is a plan view of the vehicle and trailer of FIG. 1, shown hitched together.

As shown in FIG. 1, the vehicle 10 includes a tow ball 18 for hitching to or connecting to a hitch 20a of a trailer 20. The trailer hitching assist system 12 comprises a vision or fusion system for assisting the vehicle to drive autonomously back towards a trailer, such as by controlling the vehicle 10 to follow a determined path 22 (FIG. 1) toward the trailer 20 and aligning the trailer with the vehicle tow ball so that the vehicle is a location for easy coupling and hitching the hitch 20a of the trailer 20 to the tow ball 18 of the vehicle 10 (FIG. 2). The system may also detect objects and avoid collision via automatic emergency braking (AEB) while the vehicle is backing up towards the trailer. The system may also check for camera failsafe conditions including features like dirty lens detection, out of focus conditions, moisture condensation, out of calibration and/or the like (and may provide targetless end of line camera calibration). The system may also provide object detection, automatic parking with collision avoidance, target-less camera calibration and/or targetless trailer angle detection (TAD) and the like.

The trailer hitching assist system provides path planning by estimating the physical position of trailer relative to the vehicle. The system controls the steering, braking, acceleration and/or shifting of gears (or a subset thereof) of the vehicle for autonomous reversing of the vehicle towards the trailer. During daytime lighting conditions (such as when ambient light at or near the vehicle and trailer is greater than around 6 lux), the system may be operable to maneuver the vehicle from up to 18 meters away from the trailer hitch. During nighttime lighting conditions (such as when ambient light at or near the vehicle and trailer is less than around 6 lux), the system may be operable to maneuver the vehicle from a shorter distance, such as around the range of the reverse parking lights' illumination behind the vehicle.

Figure 4:
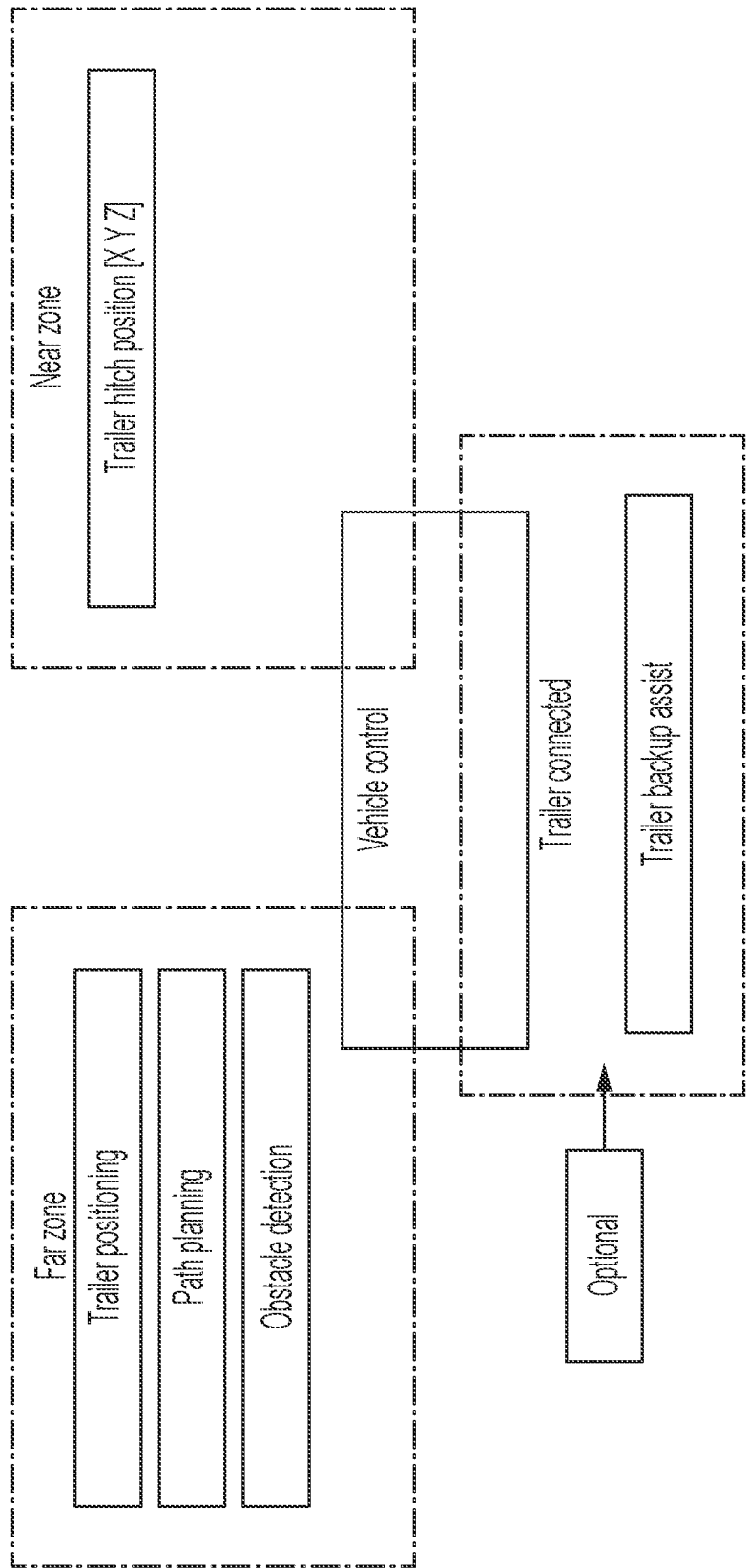
FIG. 4 is a block diagram of the functions of the trailer hitching assist system of the present invention.

The system uses human machine interface (HMI) to allow user to mark the trailer location when multiple vehicles are present in the scene encompassed by the field of view of the camera at the rear of the vehicle. When the vehicle is in a far zone (when the vehicle is greater than a threshold distance from the trailer hitch, such as around 50 cm or more) away from the trailer (see FIG. 4), the system may process image data captured by the camera to detect objects during the reversing maneuver of the vehicle towards the trailer. For example, the system may detect and classify various objects, such as pedestrians, vehicles, bicycles and other objects, which may be at or near or in the rearward path of travel of the vehicle during the hitch alignment driving maneuver.

The system may provide a trailer position estimation to align the center axis of the vehicle with the center axis of trailer with an accuracy of around +/−1 degree. When the vehicle is in a near zone (when the vehicle is less than a threshold distance from the trailer hitch, such as around 50 cm or less) from the trailer hitch (see FIG. 4), the system calculates and continuously updates the accurate physical position of trailer hitch (depth and height), such as within an accuracy of around +/−15 mm. The system may issue an alert or warning when the system determines a possible collision of the vehicle tow ball with the trailer hitch, such as when the trailer hitch height is at a level where the ball may hit the hitch instead of moving under and aligning with the hitch. The system may control vehicle systems (such as acceleration/deceleration or powertrain systems, steering and braking systems) to steer and control the vehicle to maneuver the vehicle towards and to the trailer hitch.

The system automatically aligns the towing vehicle to a trailer up to a point where the trailer coupler only needs to be lowered onto the hitch. The system supports autonomous driving towards the trailer (trailer coupler). The system calculates a dynamic path towards the trailer (or trailer coupler). The system detects obstacles in the path towards the trailer. The system regenerates the path, as altered or adjusted for obstacle avoidance.

The system detects variations in ground levels in the path planned towards the trailer. The system adapts to various environmental conditions, including, for example, different ambient lighting conditions, ground surfaces, and/or weather conditions.

The system supports hitch assist for all types of trailers including conventional trailers, fifth wheel/goose neck trailers and/or the like. The ATA system may use data from one or any combination of sensors, such as (i) a fixed or remote camera (such as a monocular camera, a binocular or stereoscope vision camera(s), a night vision camera), (ii) a LIDAR sensor, (iii) a RADAR sensor, (iv) wheel speed sensors, (v) fixed or remote ultrasonic sensors, (vi) vehicle sensors that sensor or determine or output pitch, yaw, roll, accelerometer information, (vii) a digital map—relative map with respective to the vehicle and trailer, and/or (viii) a GPS map or the like.

Figure 5:
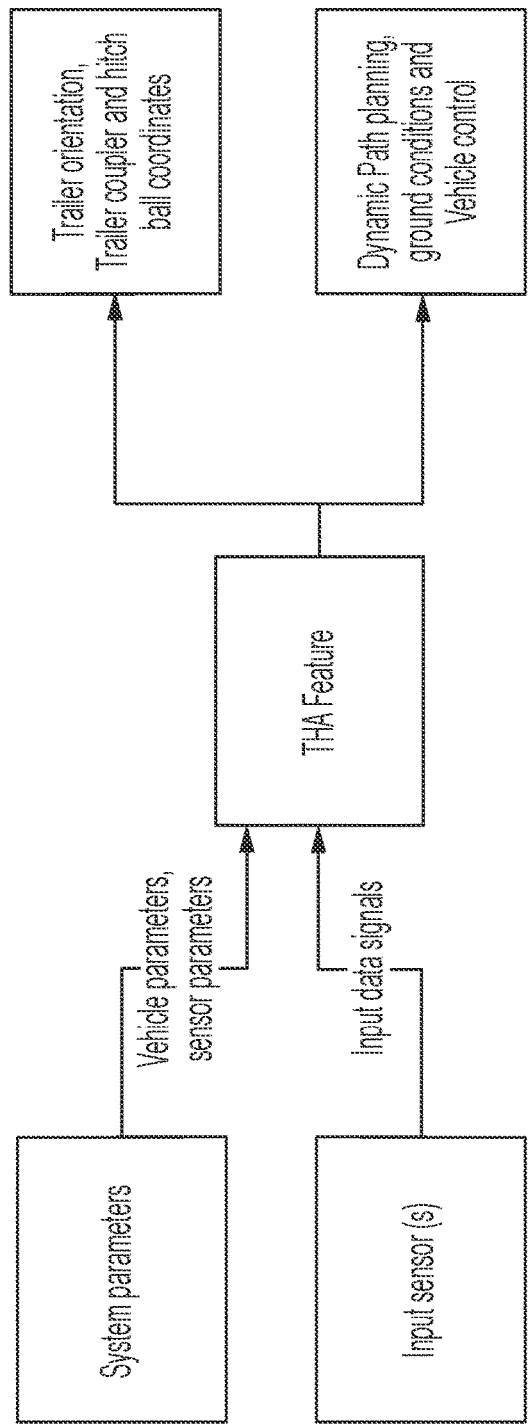
FIG. 5 is a block diagram show of a trailer hitch assist system in accordance with the present invention.
Figure 6:
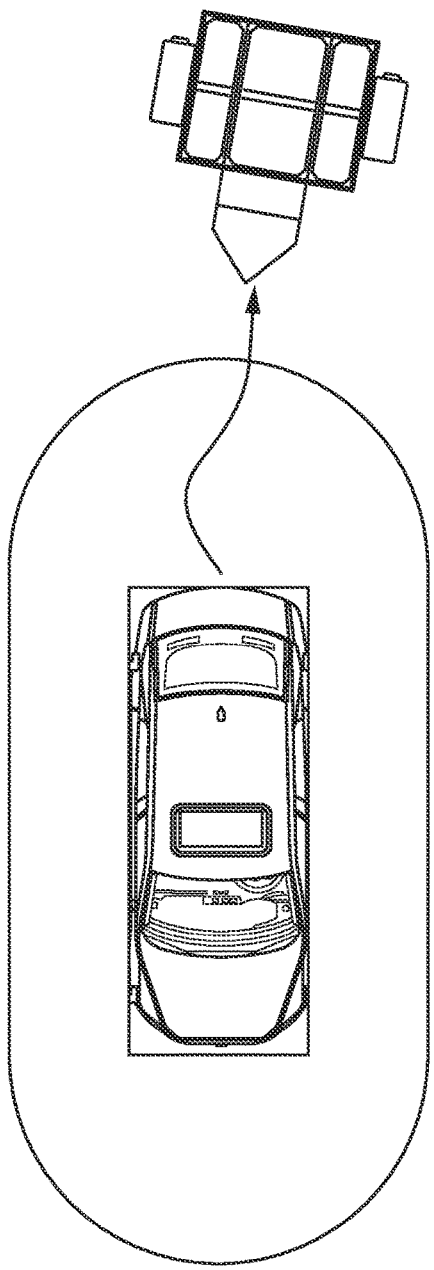
FIG. 6 is a plan view of a vehicle and a trailer, showing a reversing path for the vehicle to travel to hitch the trailer at the vehicle.

As shown in FIG. 5, the system receives system parameters inputs (e.g. vehicle parameters and sensor parameters) and receives inputs from the sensors (e.g., input data signals) and processes the parameters and sensor signals. The system determines the trailer orientation and the trailer coupler and hitch ball coordinates. The system performs dynamic path planning, taking into account ground conditions and obstacles, and controls the vehicle to maneuver the vehicle along the determined path to the trailer coupler.

The system detects objects within a detection range (X meters) from the rear bumper of the host vehicle, which is in a visible range to the rear vision camera (RVC) or CHMSL (center high mounted stop lamp) camera or other detection sensor. The Detection range of the system is based on type of sensor or sensors selected. The system functions to recognize/classify the trailers from the list of detected objects.

Figure 7:
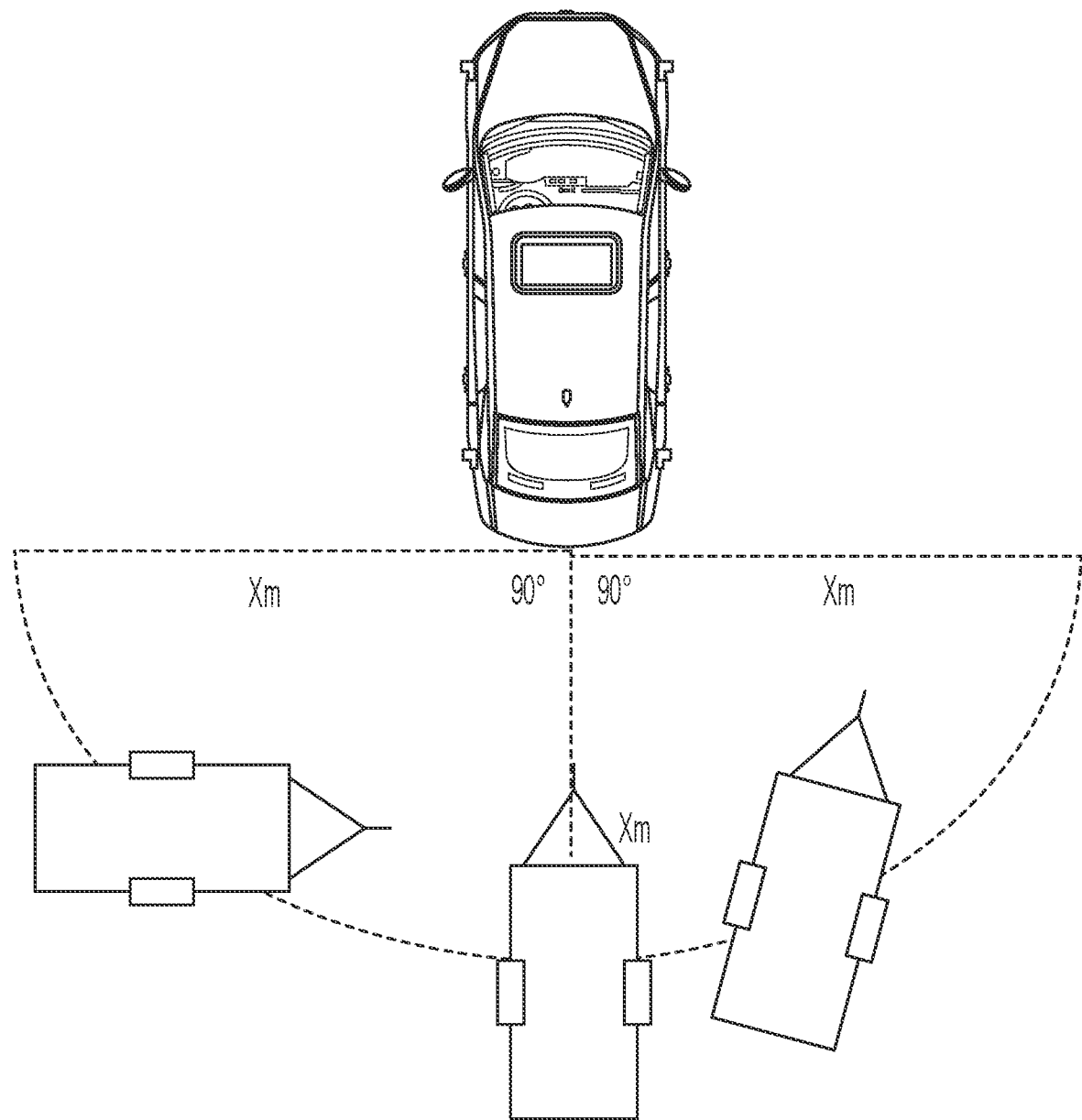
FIG. 7 is another plan view of a vehicle and a trailer, showing various orientations of a trailer relative to the vehicle.

The system is operable to recognize/classify a trailer irrespective of the trailer orientation with reference to center line axis of the host vehicle (FIG. 7). In case of multiple trailers present in the field of the camera, the system may classify and report all trailers and the system may use a user input to select the desired trailer.

Figure 9D:
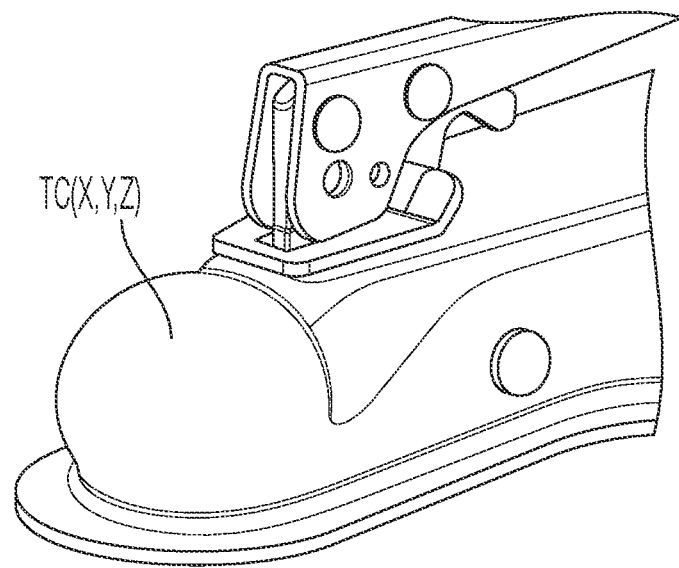
Figure 10:
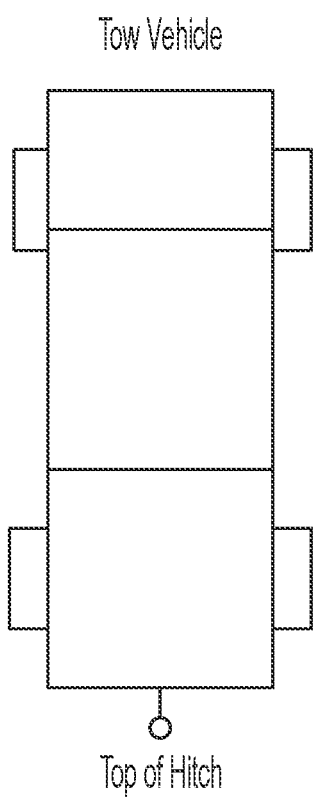
FIG. 10 is a schematic of a vehicle with a hitch ball.
Figure 11:
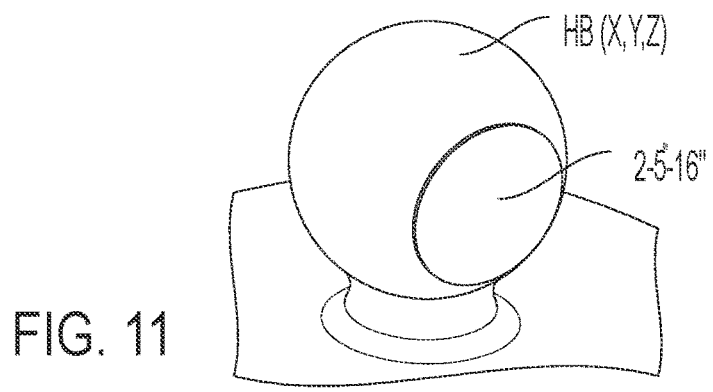
FIGS. 11 and 12 show a hitch ball of a vehicle.
Figure 12:
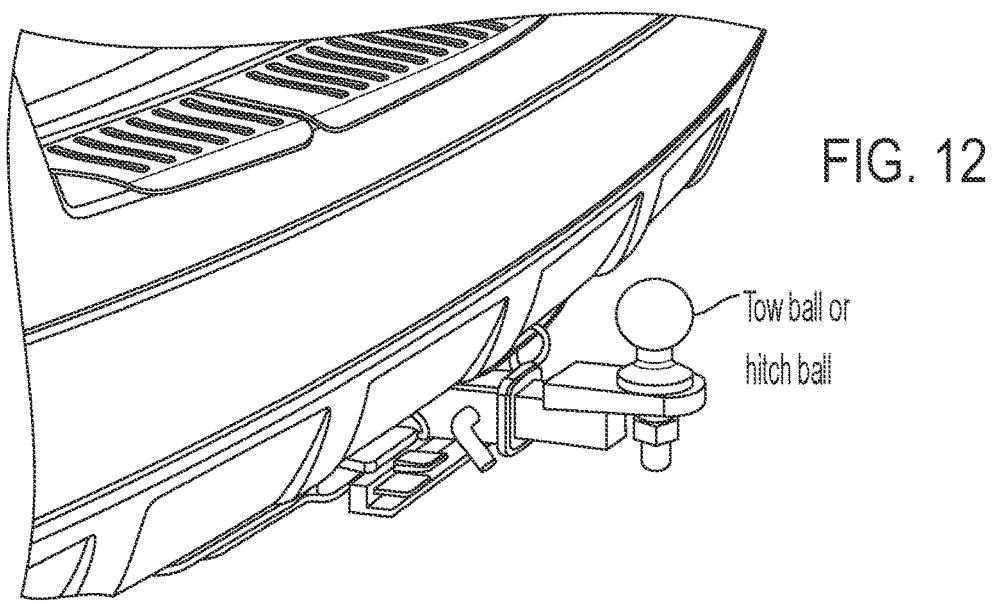
Figure 13:
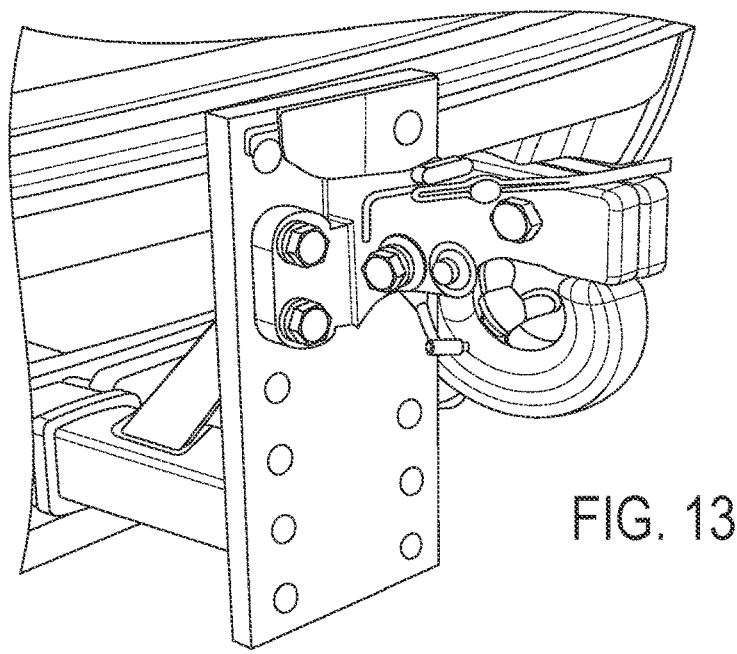
FIG. 13 shows a trailer hitch ball bracket at a rear of a vehicle.
Figure 14:
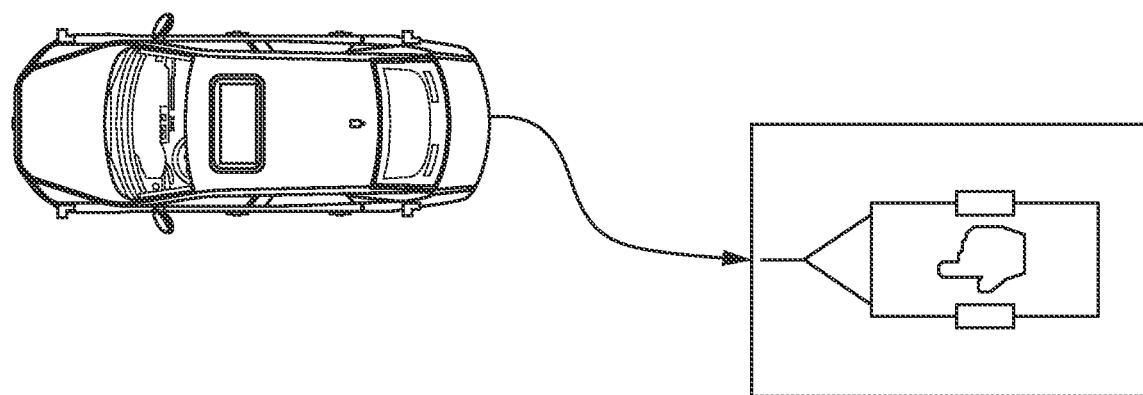
FIG. 14 is a plan view of a vehicle and trailer, showing a reversing path for the vehicle to travel to hitch the trailer at the vehicle.
Figure 15:
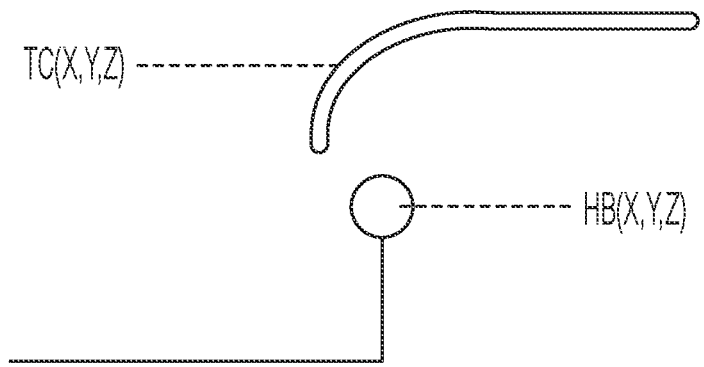
FIG. 15 is a schematic showing the trailer coupler overlapping and aligning with the hitch ball.

The system identifies boundaries of the trailer (FIG. 8), and separates the trailer cluster from the background, even from shadows. The system estimates the orientation of a trailer with respect to the center line axis of the host vehicle before starting maneuvering towards the trailer. The system uses the orientation of the trailer to determine/detect the trailer coupler near to the front surface or portion of the trailer Accuracy of the trailer coupler detection is achieved in such a way that when the system confirms the alignment of trailer coupler and hitch tip, no more user input is required for realigning them again. The trailer coupler is the tip of the front portion of the trailer that connects to the vehicle hitch. The system detects the trailer coupler using trailer coupler [X Y Z] detection methods such as a motion based algorithm and/or prior detection trailer features such as trailer front face, trailer orientation, etc. The system supports and adapts to different types of couplers, such as a ball type, a pintle type, etc. The system supports different forms of trailer tongues (FIGS. 9A-C) whose tip is the trailer coupler, such as a trailer that has straight beam (FIG. 9A), or a V-shaped tongue pointing to the center of trailer coupler (FIG. 9B), or a trailer that has V-shaped tongue not pointing to the center of trailer coupler (FIG. 9C).

The system supports different types of hitch tips (the tip of the hitch attached to the towing vehicle to which the trailer shall be connected) such as ball type (FIG. 9D), pintle type or the like. The hitch tip on the host towing vehicle is detected either using a monocular vision camera or any combination of sensors listed above. Accuracy of hitch tip detection is achieved in such a way that when the system confirms the alignment of trailer coupler and hitch tip, no more user input is required for realigning them again.

The system may utilize data from other sensors including Ultrasonic, LIDAR, RADAR to find the hitch tip location, such as when the hitch is not visible to the rear view camera, and/or to build more robustness against different environmental/ambient conditions.

The system may detect the hitch tip [X Y Z] using various methods, such as motion based estimation, shape detection and/or using reference data such as ground pixels and other physical objects.

The system determines the path of the vehicle travel in order to maneuver the vehicle from its current position to the final position as determined by the detection system. The system completes the maneuver when the vehicle hitch tip is aligned with the trailer coupler. The system completes the maneuver with an optimal number of control commands. The system may report a warning for possible collision of the hitch ball with the trailer coupler (when they are at same height). The system aligns the trailer coupler and hitch tip in such a way that no more user input is required for realigning them again. The system is responsible for vehicle control (triggers) such as the vehicle steering, the gear shifting, the vehicle autonomous emergency braking system and the vehicle accelerator during a parking maneuver.

Figure 16:
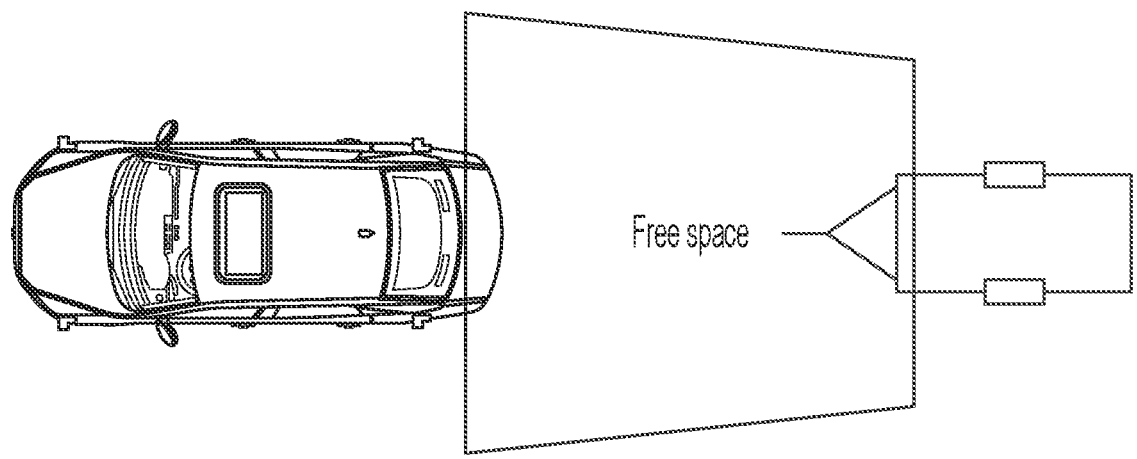
FIGS. 16-18 are other plan views of a vehicle and trailer.
Figure 17:
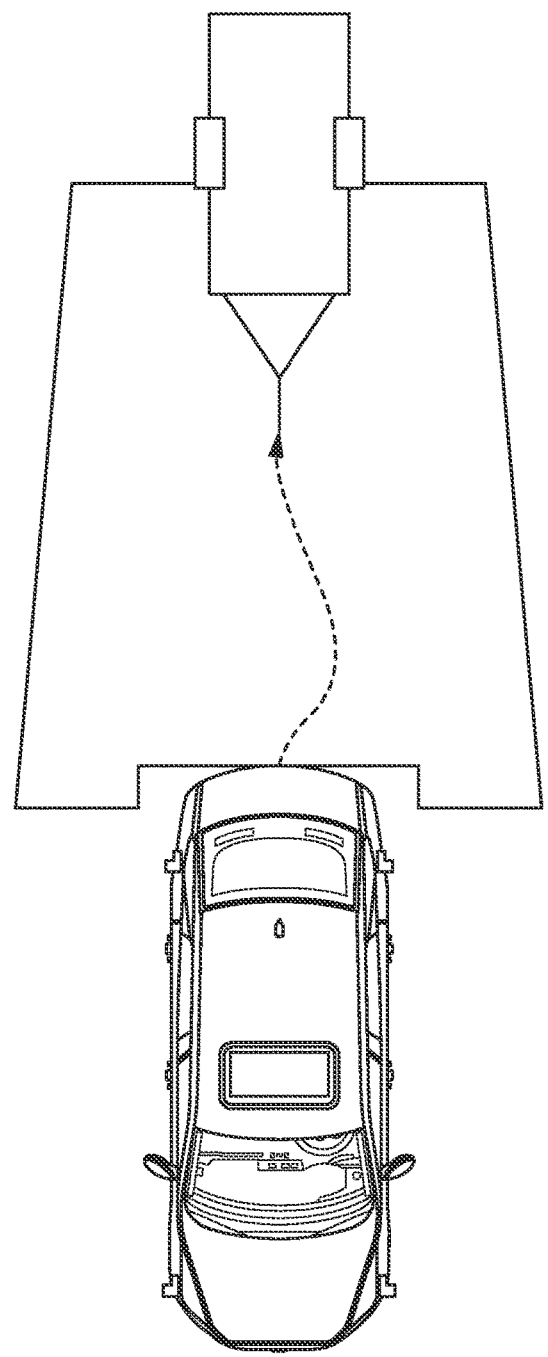
Figure 18:
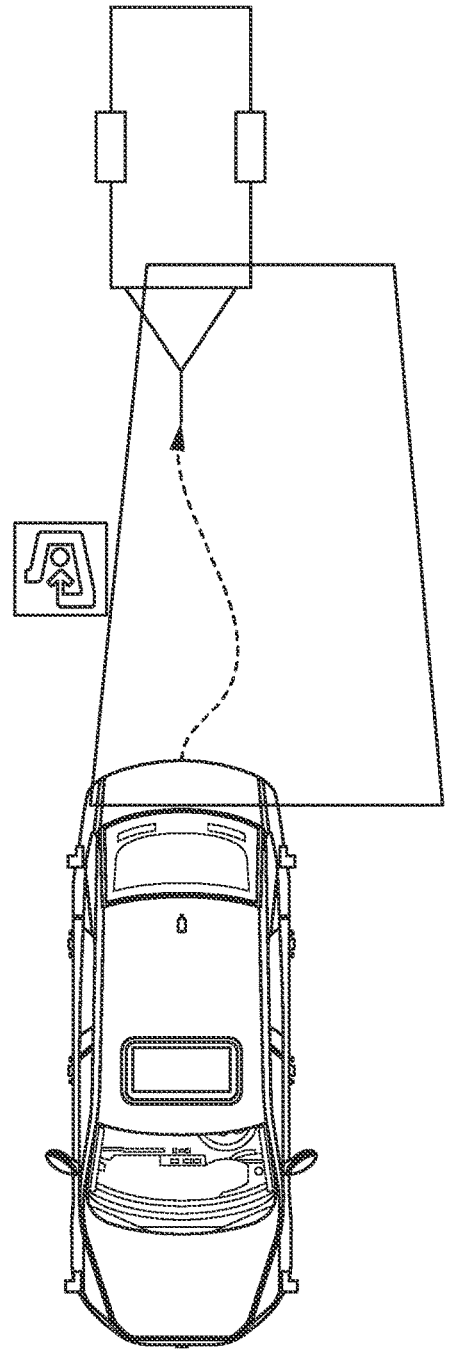

During host vehicle maneuver towards a trailer, the system detects the free space between the rear end of the host vehicle and the trailer coupler (FIG. 16). The system estimates the ground levels for the path planned (FIG. 17). The system reports if the difference in ground levels is too high for maneuver using graphical user interface. For example, if the system detects curbs in the path planned, if the trailer is at different height than the host vehicle, and/or if there are uneven ground levels in the path planned.

The system obtains and determines information about the objects in the path planned via an object detection module of the vehicle. When an object is present that obstructs the path of the host vehicle, the system estimates a new path in which the vehicle will not collide with the detected object in the path planned. The system will report if the new path planned is not maneuverable. The system will report possible collision of the host vehicle with an object/obstacle and may activate an emergency braking system of the vehicle to avoid the collision.

Figure 19:
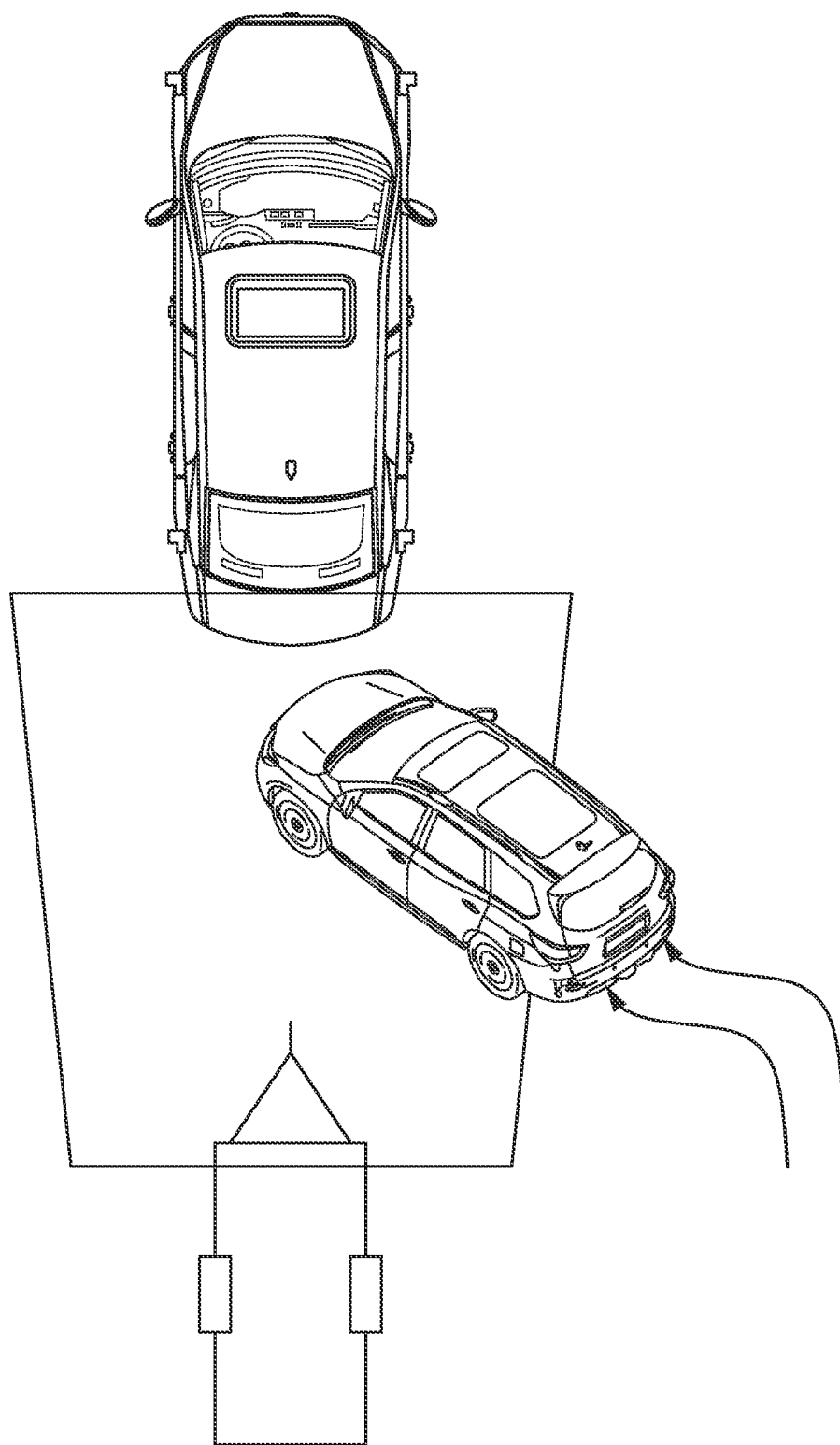
FIG. 19 is another plan view of a vehicle and trailer, showing another vehicle interfering with the path of the vehicle toward the trailer.
Figure 20:
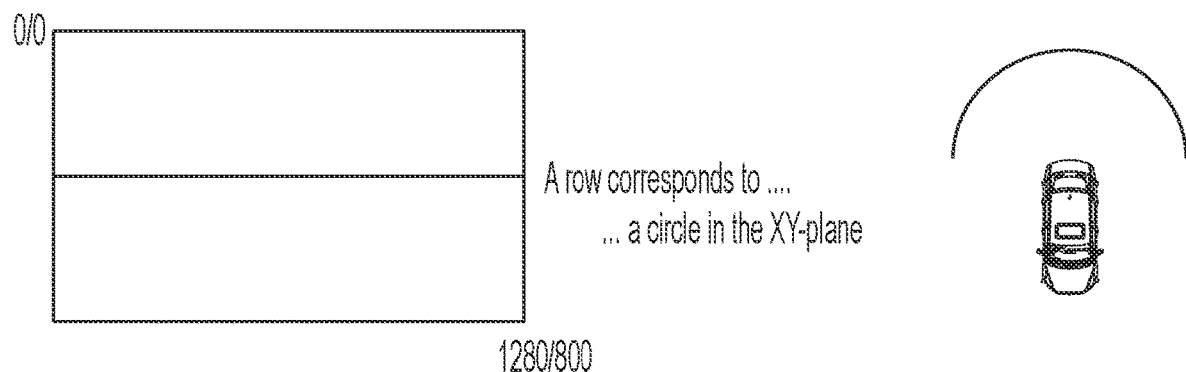
FIG. 20 is schematic illustrating a cylindrical view of the camera.
Figure 21:
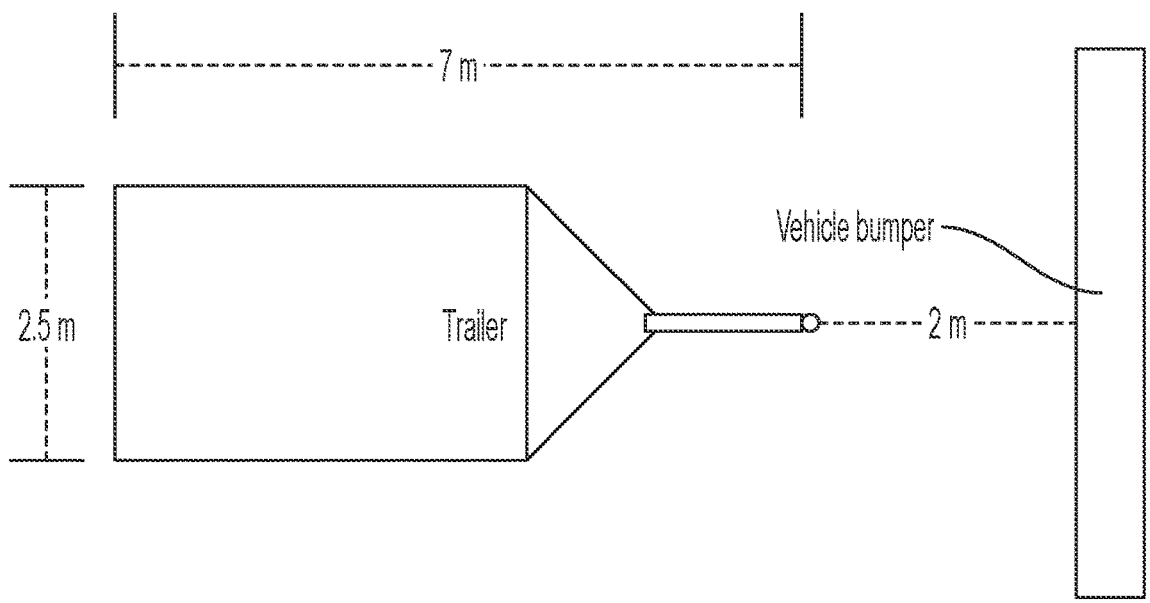
FIG. 21 is a schematic illustrating a top down view of the camera.

The system detects and halts the maneuver when an object comes into the path of the host vehicle (FIG. 19). If the object moves away from the path, the system resumes maneuvering towards the trailer in the path that was planned earlier. If the object stays in the path for a while, the system determines or generates a new path towards the trailer and will start maneuvering the vehicle along the new path and the system will report if the newly generated path is not suitable for maneuvering the vehicle along.

The system may utilize any suitable camera view, such as a cylindrical view. In a cylindrical view of a rear camera, the left edge of the image (first column) corresponds to the Y axis of the vehicle coordinate system and the right edge of the image (last column) corresponds to the −Y axis of the vehicle coordinate system. The trailer located in the detection area of the trailer hitch assist system at the same distance from the camera shall be size in-variant in the image provided to the trailer hitch assist algorithm.

Optionally, the system may utilize a top camera view, where the camera image is projected vertically to a surface plane (plane of projection) and is free of distortion in the input image caused by the fish eye lens (or wide angle lens). The top view image may be extremely useful to accurately measure physical position and dimensions of an object on the plane of projection.

Thus, the trailer hitching assist system of the present invention provides autonomous driving towards a trailer with various types of object detection and collision avoidance with automatic emergency braking (AEB). The system provides accurate alignment of the vehicle's tow ball with a trailer hitch without manual intervention. The system also determines camera failsafe conditions and may provide target less end of line camera calibration. The system may also provide trailer angle detection that provides backup assist for the vehicle with the trailer hitched to it by detecting the absolute angle of the trailer with respective to the vehicle's center axis to limit or preclude jackknifing the trailer.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The system may utilize aspects of the trailering or trailer angle detection systems described in U.S. Pat. Nos. 9,085,261 and/or 6,690,268, and/or U.S. Publication Nos. US-2017-0254873; US-2017-0217372; US-2017-0050672; US-2015-0217693; US-2014-0160276; US-2014-0085472 and/or US-2015-0002670, and/or U.S. provisional applications, Ser. No. 62/533,694, filed Jul. 18, 2017, Ser. No. 62/518,765, filed Jun. 13, 2017, Ser. No. 62/474,646, filed Mar. 22, 2017, Ser. No. 62/474,645, filed Mar. 22, 2017, Ser. No. 62/474,644, filed Mar. 22, 2017, and/or Ser. No. 62/466,449, filed Mar. 3, 2017, which are hereby incorporated herein by reference in their entireties.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017847; US-2017-0015312 and/or US-2015-0344028, which are hereby incorporated herein by reference in their entireties.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2018/007995 and/or WO 2011/090484 and/or U.S. Publication Nos. US-2018-0015875; US-2017-0356994; US-2017-0315231; US-2017-0276788; US-2017-0254873; US-2017-0222311 and/or US-2010-0245066, and/or U.S. patent application Ser. No. 15/675,919, filed Aug. 14, 2017, now U.S. Pat. No. 10,641,867, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties. Optionally, the vision system (utilizing a forward viewing camera and a rearward viewing camera and other cameras disposed at the vehicle with exterior fields of view) may be part of or may provide a display of a top-down view or bird's-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. Publication No. US-2012-0162427, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer hitching assist system, the vehicular trailer hitching assist system comprising:
   a camera, wherein the camera is configured to be disposed at a rear portion of a vehicle so as to view at least rearward of the vehicle;
   wherein the camera comprises an imaging array having at least one million photosensors arranged in rows and columns;
   an electronic control unit (ECU) disposed at the vehicle, the ECU comprising an image processor operable to process image data captured by the camera with the camera disposed at the rear portion of the vehicle;
   wherein, with the camera disposed at the rear portion of the vehicle, the ECU, via image processing by the image processor of the image data captured by the camera, detects a trailer that is present rearward of the vehicle and determines a first path of travel for the vehicle to follow to maneuver the vehicle toward the trailer and to align a tow ball of the vehicle with a trailer hitch of the trailer as the vehicle approaches the trailer;

wherein the ECU, responsive to determination of the first path of travel, generates an output to maneuver the vehicle along the determined first path of travel;

wherein, with the camera disposed at the rear portion of the vehicle and with the vehicle maneuvering along the determined first path of travel, the ECU, at least via image processing by the image processor of the image data captured by the camera, detects an object entering the determined first path of travel; and wherein, with the camera disposed at the rear portion of the vehicle, and responsive to the detection of the object entering the determined first path of travel, the ECU, at least via image processing by the image processor of the image data captured by the camera, determines a second path of travel for the vehicle to follow that avoids the detected object.

2. The vehicular trailer hitching assist system of claim 1, wherein the ECU performs object detection when a determined trailer position is greater than a threshold distance from the vehicle.

3. The vehicular trailer hitching assist system of claim 1, wherein the ECU determines a third path of travel responsive to detection of an object in the determined second path of travel.

4. The vehicular trailer hitching assist system of claim 1, wherein the ECU, responsive to determination of the second path of travel, adjusts the output to maneuver the vehicle along the determined second path of travel and to avoid the detected object and to align the tow ball of the vehicle with the trailer hitch of the trailer as the vehicle approaches the trailer.

5. The vehicular trailer hitching assist system of claim 4, wherein, responsive to determination that the detected object moves out of the determined first path of travel, the ECU adjusts the output to maneuver the vehicle along the determined first path of travel.

6. The vehicular trailer hitching assist system of claim 1, wherein the ECU, with the camera disposed at the rear portion of the vehicle and via image processing by the image processor of the image data captured by the camera, determines an orientation of the trailer relative to the vehicle.

7. The vehicular trailer hitching assist system of claim 6, wherein the ECU determines the orientation of the trailer relative to the vehicle prior to determining the first path of travel.

8. The vehicular trailer hitching assist system of claim 1, wherein the ECU, responsive to determining that the second path of travel is not followable, stops the vehicle.

9. The vehicular trailer hitching assist system of claim 1, wherein the ECU, responsive to determining that the second path of travel is not followable, generates an alert to a driver of the vehicle.

10. The vehicular trailer hitching assist system of claim 1, wherein the ECU, with the camera disposed at the rear portion of the vehicle, and via image processing by the image processor of the image data captured by the camera, determines a position of the trailer hitch of the trailer, and wherein the determined position of the trailer hitch includes a height of the trailer hitch.

11. The vehicular trailer hitching assist system of claim 10, wherein the ECU determines the position of the trailer hitch when the trailer hitch is less than a threshold distance from the vehicle.

12. The vehicular trailer hitching assist system of claim 1, wherein the ECU is part of the camera.

13. The vehicular trailer hitching assist system of claim 1, wherein the ECU is disposed at the vehicle separate from the rear portion of the vehicle where the camera is disposed.

14. The vehicular trailer hitching assist system of claim 1, wherein the output of the ECU controls at least one vehicular function to maneuver the vehicle.

15. The vehicular trailer hitching assist system of claim 14, wherein the at least one vehicular function is selected from the group consisting of (i) steering the vehicle and (ii) braking the vehicle.

16. The vehicular trailer hitching assist system of claim 15, wherein the at least one vehicular function includes at least one selected from the group consisting of (i) accelerating the vehicle and (ii) shifting gears of the vehicle.

17. A vehicular trailer hitching assist system, the vehicular trailer hitching assist system comprising:

a camera, wherein the camera is configured to be disposed at a rear portion of a vehicle so as to view at least rearward of the vehicle;

wherein the camera comprises an imaging array having at least one million photosensors arranged in rows and columns;

an electronic control unit (ECU) disposed at the vehicle, the ECU comprising an image processor operable to process image data captured by the camera with the camera disposed at the rear portion of the vehicle;

wherein, with the camera disposed at the rear portion of the vehicle, the ECU, via image processing by the image processor of the image data captured by the camera, (i) detects a trailer that is present rearward of the vehicle, (ii) determines an orientation of the trailer relative to the vehicle and (iii) determines a first path of travel for the vehicle to follow to maneuver the vehicle toward the trailer and to align a tow ball of the vehicle with a trailer hitch of the trailer as the vehicle approaches the trailer;

wherein the ECU, responsive to determination of the first path of travel, generates an output to maneuver the vehicle along the determined first path of travel;

wherein, with the camera disposed at the rear portion of the vehicle and with the vehicle maneuvering along the determined first path of travel, the ECU, at least via image processing by the image processor of the image data captured by the camera, detects an object entering the determined first path of travel;

wherein, with the camera disposed at the rear portion of the vehicle, and responsive to the detection of the object entering the determined first path of travel, the ECU, at least via image processing by the image processor of the image data captured by the camera, determines a second path of travel for the vehicle to follow that avoids the detected object; and wherein the ECU, responsive to determining that the second path of travel is not followable, one selected from the group consisting of (i) stops the vehicle, (ii) generates an alert to a driver of the vehicle, (iii) determines a third path of travel for the vehicle to follow to maneuver the vehicle toward the trailer and to align the tow ball of the vehicle with the trailer hitch of the trailer as the vehicle approaches the trailer.

18. The vehicular trailer hitching assist system of claim 17, wherein the ECU, responsive to determination of the second path of travel, adjusts the output to maneuver the vehicle along the determined second path of travel and to avoid the detected object and to align the tow ball of the vehicle with the trailer hitch of the trailer as the vehicle approaches the trailer.

19. The vehicular trailer hitching assist system of claim 18, wherein the ECU, responsive to determining that the second path of travel is not followable, one selected from the group consisting of (i) determines the third path of travel for the vehicle to follow and adjusts the output to maneuver the vehicle along the determined third path of travel to align the tow ball of the vehicle with the trailer hitch of the trailer as the vehicle approaches the trailer, and (ii) adjusts the output to maneuver the vehicle to resume following the determined first path of travel if the detected object has moved from the determined first path of travel.

20. The vehicular trailer hitching assist system of claim 17, wherein the ECU determines the orientation of the trailer relative to the vehicle prior to determining the first path of travel.

21. The vehicular trailer hitching assist system of claim 17, wherein the ECU, with the camera disposed at the rear portion of the vehicle, and via image processing by the image processor of the image data captured by the camera, determines a position of the trailer hitch of the trailer, and wherein the determined position of the trailer hitch includes a height of the trailer hitch.

22. The vehicular trailer hitching assist system of claim 21, wherein the ECU determines the position of the trailer hitch when the trailer hitch is less than a threshold distance from the vehicle.

23. A vehicular trailer hitching assist system, the vehicular trailer hitching assist system comprising:
   a camera, wherein the camera is configured to be disposed at a rear portion of a vehicle so as to view at least rearward of the vehicle;
   wherein the camera comprises an imaging array having at least one million photosensors arranged in rows and columns;
   an electronic control unit (ECU) disposed at the vehicle, the ECU comprising an image processor operable to process image data captured by the camera with the camera disposed at the rear portion of the vehicle;
   wherein, with the camera disposed at the rear portion of the vehicle, the ECU, via image processing by the image processor of the image data captured by the camera, (i) detects a trailer that is present rearward of the vehicle, (ii) determines an orientation of the trailer relative to the vehicle and (iii) determines a first path of travel for the vehicle to follow to maneuver the vehicle toward the trailer and to align a tow ball of the vehicle with a trailer hitch of the trailer as the vehicle approaches the trailer;
   wherein the ECU, responsive to determination of the first path of travel, generates an output to control at least one vehicular function to maneuver the vehicle along the determined first path of travel;
   wherein, with the camera disposed at the rear portion of the vehicle and with the vehicle maneuvering along the determined first path of travel, the ECU, at least via image processing by the image processor of the image data captured by the camera, detects an object entering the determined first path of travel; and
   wherein, with the camera disposed at the rear portion of the vehicle, and responsive to the detection of the object entering the determined first path of travel, the ECU, at least via image processing by the image processor of the image data captured by the camera, determines a second path of travel for the vehicle to follow that avoids the detected object.

24. The vehicular trailer hitching assist system of claim 23, wherein the ECU, responsive to determination of the second path of travel, adjusts the output to control the at least one vehicular function to maneuver the vehicle along the determined second path of travel and to avoid the detected object and to align the tow ball of the vehicle with the trailer hitch of the trailer as the vehicle approaches the trailer.

25. The vehicular trailer hitching assist system of claim 23, wherein the ECU determines the orientation of the trailer relative to the vehicle prior to determining the first path of travel.

26. The vehicular trailer hitching assist system of claim 23, wherein the ECU, responsive to determining that the second path of travel is not followable, stops the vehicle.

27. The vehicular trailer hitching assist system of claim 23, wherein the ECU, responsive to determining that the second path of travel is not followable, generates an alert to a driver of the vehicle.

28. The vehicular trailer hitching assist system of claim 23, wherein the at least one vehicular function is selected from the group consisting of (i) steering the vehicle and (ii) braking the vehicle.

29. The vehicular trailer hitching assist system of claim 28, wherein the at least one vehicular function includes at least one selected from the group consisting of (i) accelerating the vehicle and (ii) shifting gears of the vehicle.

* * * * *